US011325656B2

(12) United States Patent
Glickman et al.

(10) Patent No.: US 11,325,656 B2
(45) Date of Patent: May 10, 2022

(54) DRAINAGE SYSTEM FOR A VEHICLE

(71) Applicant: Ford Global Technologies, LLC, Dearborn, MI (US)

(72) Inventors: David Brian Glickman, Southfield, MI (US); Darshan Arun Nayak, Northville, MI (US); Aaron Halonen, Brighton, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 17/007,434

(22) Filed: Aug. 31, 2020

(65) Prior Publication Data

US 2021/0086840 A1 Mar. 25, 2021

Related U.S. Application Data

(60) Provisional application No. 62/902,651, filed on Sep. 19, 2019.

(51) Int. Cl.
*B60J 7/00* (2006.01)
*B62D 25/24* (2006.01)
*B60R 7/02* (2006.01)
*B62D 25/20* (2006.01)

(52) U.S. Cl.
CPC .............. *B62D 25/24* (2013.01); *B60R 7/02* (2013.01); *B62D 25/20* (2013.01)

(58) Field of Classification Search
CPC ......... Y02E 60/10; A61P 35/00; A61K 38/00; A61J 1/10; B62D 55/0887; Y10S 220/33; B60K 15/0406; B26B 21/521; B26B 21/225
See application file for complete search history.

(56) References Cited

U.S. PATENT DOCUMENTS

| 1,903,366 | A |   | 3/1932 | Mercier |            |
|-----------|---|---|--------|---------|------------|
| 3,205,808 | A | * | 9/1965 | Barr ...................... | B62D 25/24 |
|           |   |   |        |         | 454/147    |
| 4,071,273 | A | * | 1/1978 | Hack ...................... | B60R 13/07 |
|           |   |   |        |         | 137/354    |
| 4,091,962 | A | * | 5/1978 | van Buren, Jr. ....... | B62D 25/24 |
|           |   |   |        |         | 220/323    |
| 4,188,058 | A | * | 2/1980 | Resa ...................... | B60R 13/01 |
|           |   |   |        |         | 296/208    |

(Continued)

*Primary Examiner* — Kiran B Patel
(74) *Attorney, Agent, or Firm* — Vichit Chea; Price Heneveld LLP

(57) ABSTRACT

A drainage system for a vehicle is disclosed herein. A drain is disposed within a vehicle substrate and has a floor. A receiver is disposed proximate to the floor. A cap feature is operably coupled to the drain and is operable between first and second positions relative to the drain. The cap feature includes an upper platform and a sidewall that extends generally downward from the upper platform. A cutout is defined by the cap feature and is configured to allow liquid to flow through the cap feature. An engagement feature is coupled to the cap feature and is operable between a disengaged position and an engaged position in which the engagement feature is engaged with the receiver. Movement of the cap feature from the first position to the second position moves the engagement feature from the disengaged position to the engaged position.

20 Claims, 10 Drawing Sheets

(56) References Cited

U.S. PATENT DOCUMENTS

| | | | | |
|---|---|---|---|---|
| 4,700,981 A | * | 10/1987 | Seyler | B21D 39/20 |
| | | | | 156/295 |
| 4,930,659 A | * | 6/1990 | Sauber | B62D 25/24 |
| | | | | 220/367.1 |
| 5,178,435 A | * | 1/1993 | Anderson | B60R 13/07 |
| | | | | 296/208 |
| 5,709,309 A | * | 1/1998 | Gallagher | B62D 25/24 |
| | | | | 137/849 |
| 6,145,909 A | * | 11/2000 | Staley | B60J 7/0084 |
| | | | | 296/107.08 |
| 6,361,099 B1 | * | 3/2002 | McIntosh | B60N 3/04 |
| | | | | 220/235 |
| 6,578,896 B1 | * | 6/2003 | Peterson | B60R 13/011 |
| | | | | 296/208 |
| 6,631,941 B1 | * | 10/2003 | Votruba | B62D 63/064 |
| | | | | 296/208 |
| D482,650 S | * | 11/2003 | Ludwick | D12/400 |
| 7,118,151 B2 | * | 10/2006 | Bejin | B60R 5/04 |
| | | | | 296/37.1 |
| D743,509 S | | 11/2015 | Traub | |
| 9,643,113 B2 | | 5/2017 | Farmer | |
| 11,001,443 B1 | * | 5/2021 | Skaloud | B62D 61/10 |
| 2006/0220376 A1 | * | 10/2006 | Pangallo | B62D 25/24 |
| | | | | 285/202 |
| 2006/0255610 A1 | * | 11/2006 | Bejin | B60R 5/04 |
| | | | | 296/37.1 |
| 2018/0195287 A1 | | 7/2018 | Huber | |
| 2021/0086840 A1 | * | 3/2021 | Glickman | B62D 25/24 |

* cited by examiner under 35 U.S.C. §
DRAINAGE SYSTEM FOR A VEHICLE

CROSS-REFERENCE TO RELATED APPLICATIONS

This patent application claims priority under 35 U.S.C. § 119(e) to U.S. Provisional Patent Application No. 62/902,651, entitled "DRAINAGE SYSTEM FOR A VEHICLE," filed Sep. 19, 2019, the entire disclosure of which is incorporated herein by reference.

FIELD OF THE DISCLOSURE

The present disclosure generally relates to drain assemblies for vehicles. More specifically, the present disclosure relates to a drain assembly having a drain and a cap feature.

BACKGROUND OF THE DISCLOSURE

Vehicles often include storage compartments. Some vehicles include storage compartments, such as a front trunk. Some vehicle storage compartments may include drains to drain liquid from the storage compartments when users are cleaning the storage compartments. Drain assemblies that aid in alleviating drain clogging may be desired.

SUMMARY OF THE DISCLOSURE

According to a first aspect of the present disclosure, a drainage system for a vehicle includes a drain disposed within a vehicle substrate. The drain includes a floor. A plurality of apertures are defined by the floor and are configured to allow liquid to flow through the drain. A cap feature is operably coupled to the drain and includes an upper platform and a sidewall that extends generally downward from the upper platform to define a recess. A cutout is defined by the cap feature and is configured to allow liquid to flow through the cap feature. The sidewall and the upper platform define the cutout such that the cutout extends through a portion of the sidewall and a portion of the upper platform.

Embodiments of the first aspect of the present disclosure may include any one or combination of the following features:

a receiver disposed proximate to the floor of the drain, and an engagement feature coupled to the cap feature and operable between a disengaged position and an engaged position in which the engagement feature is engaged with the receiver, wherein the cap feature is operable to move between first and second positions relative to the drain and movement of the cap feature from the first position to the second position moves the engagement feature from the disengaged position to the engaged position;

the receiver is an elongated aperture extending through the floor of the drain;

the engagement feature extends downward from the upper platform of the cap feature into the recess and is configured to protrude through the receiver in the engaged position;

the engagement feature is configured to protrude through the receiver in the disengaged position;

the cap feature moves from the first position to the second position via rotational movement of the cap feature;

the engagement feature comprises a leg coupled to the upper platform at a first end and extending downward to a second end and a foot coupled to the leg proximate to the second end of the leg and extending outward therefrom;

the foot of the engagement feature is aligned with the receiver in the first position of the cap feature and is not aligned with the receiver in the second position of the cap feature;

the sidewall of the cap feature comprises a lower rim disposed cap feature-downward of the cutout; and the cap feature contains phosphor configured to be energized by light.

According to a second aspect of the present disclosure, a vehicle includes a storage compartment having a base and a storage compartment sidewall that extends generally vehicle-upward from the base. The storage compartment is a front trunk of the vehicle. A drain assembly is disposed proximate to the base. The drain assembly includes a drain disposed within the base and having a floor. A plurality of apertures are defined by the floor and are configured to allow liquid to flow through the drain. A cap feature is operable between an assembled position, wherein the cap feature is assembled to the drain, and a removed position. The cap feature includes an upper platform and a sidewall that extends generally downward from the upper platform. A cutout is defined by the cap feature and is configured to allow liquid to flow through the cap feature. An anchoring feature is coupled to the cap feature and the drain in the assembled position of the cap feature and the removed position of the cap feature.

Embodiments of the second aspect of the present disclosure may include any one or combination of the following features:

the anchoring feature comprises a tether that extends through a hole defined by the upper platform of the cap feature and through at least one of the plurality of apertures defined by the floor of the drain;

the tether slides within at least one of the plurality of apertures as the cap feature moves between the assembled position and the removed position;

the anchoring feature comprises a ball coupled to the tether and configured to be seated within a socket defined by the upper platform of the cap feature; and the sidewall and the upper platform of the cap feature define the cutout such that the cutout extends through a portion of the sidewall and a portion of the upper platform.

According to a third aspect of the present disclosure, a vehicle includes a storage compartment disposed within the vehicle. A light-emitting device is coupled to the vehicle and is configured to emit light into the storage compartment. A drain is disposed within a base of the storage compartment. A cap feature is operably coupled to the drain and includes a cutout configured to allow liquid to flow through the cap feature and into the drain. A phosphor is coupled to the cap feature. The phosphor is configured to be energized by the light emitted by the light-emitting device and emit visible light.

Embodiments of the third aspect of the present disclosure may include any one or combination of the following features:

the phosphor is contained within a material of the cap feature, such that the cap feature is configured to emit visible light via the phosphor;

the cap feature comprises an upper platform and a sidewall extending generally downward from the upper platform to define a recess;

the cutout is defined by the upper platform and the sidewall and extends through a portion of the sidewall and a portion of the upper platform; and the cap feature comprises a lower rim disposed cap feature-downward of the cutout.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
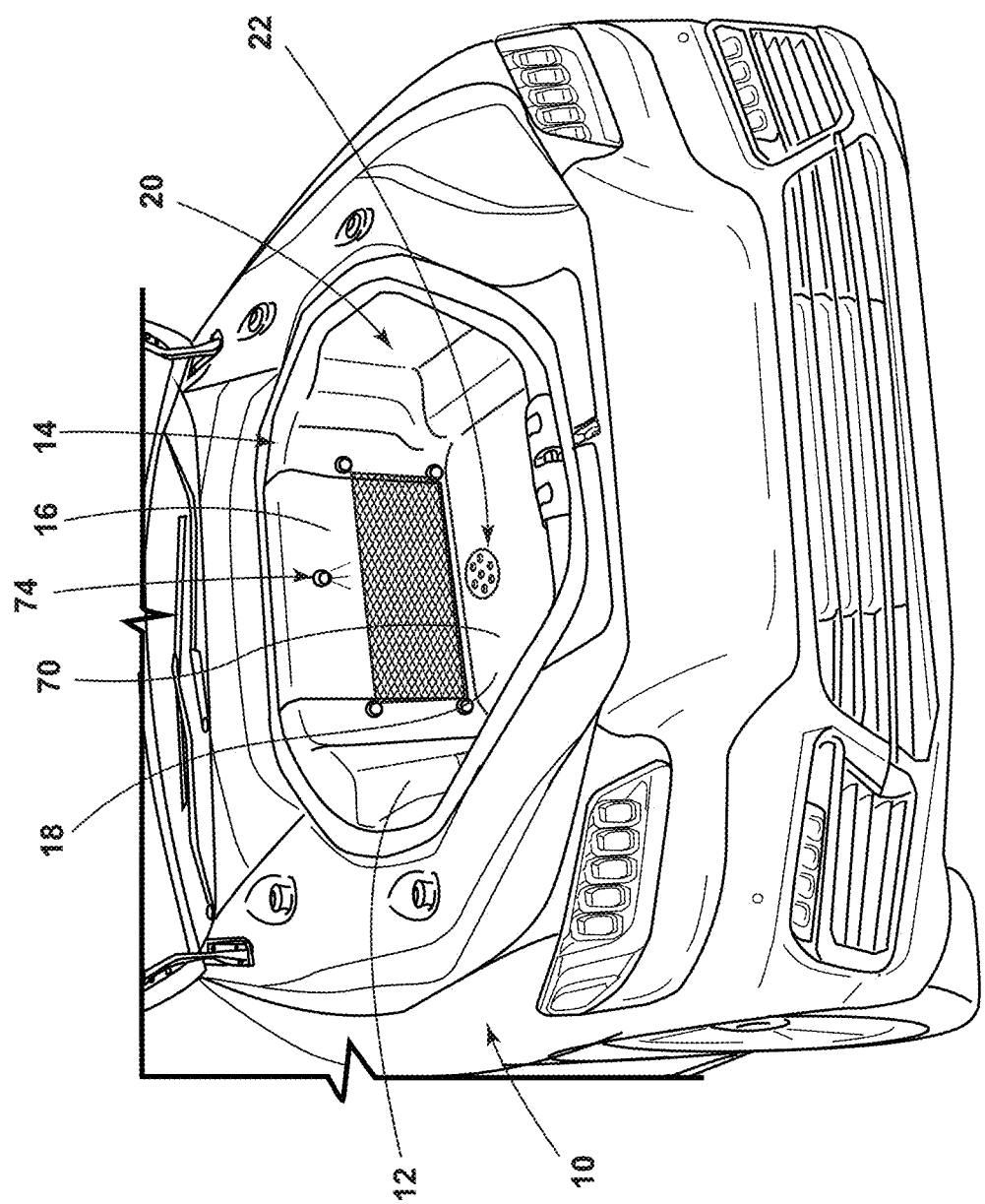
FIG. 1 is a perspective view of a vehicle, illustrating a front trunk and a drain disposed within the front trunk, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-10, a vehicle 10 is disclosed herein. The vehicle 10 includes a storage compartment 12 that is a front trunk 14 of the vehicle 10. The storage compartment 12 includes a base 18 and a storage compartment sidewall 16 that extends generally vehicle-upward from the base 18. A drain assembly 22 is disposed proximate to the base 18 and includes a drain 24 disposed within the base 18. The drain 24 includes a floor 28. A plurality of apertures 30 are defined by the floor 28 and are configured to allow liquid to flow through the drain 24. A receiver 32 is defined by the floor 28 of the drain 24. A cap feature 34 is operably coupled to the drain 24 and is operable between first and second positions relative to the drain 24. The cap feature 34 includes an upper platform 38 and a sidewall 36 that extends generally downward from the upper platform 38. A cutout 40 is defined by the cap feature 34 and may be configured to allow liquid to flow through the cap feature 34. An engagement feature 44 is coupled to the cap feature 34 and is operable between a disengaged position and an engaged position in which the engagement feature 44 is engaged with the receiver 32.

Figure 2:
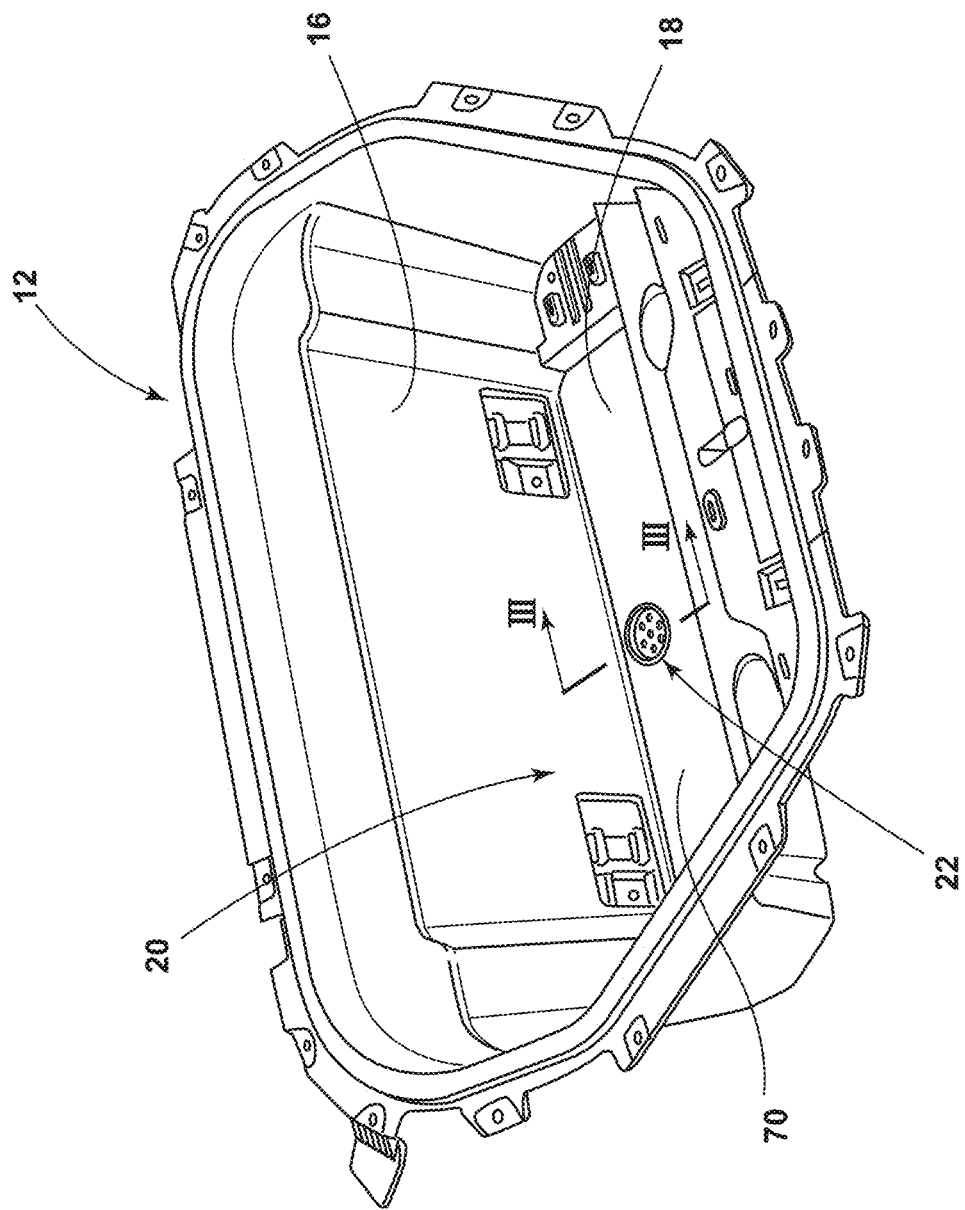
FIG. 2 is a perspective view of a storage compartment for a vehicle, illustrating a drain disposed within a base of the storage compartment, according to one embodiment.
Figure 3:
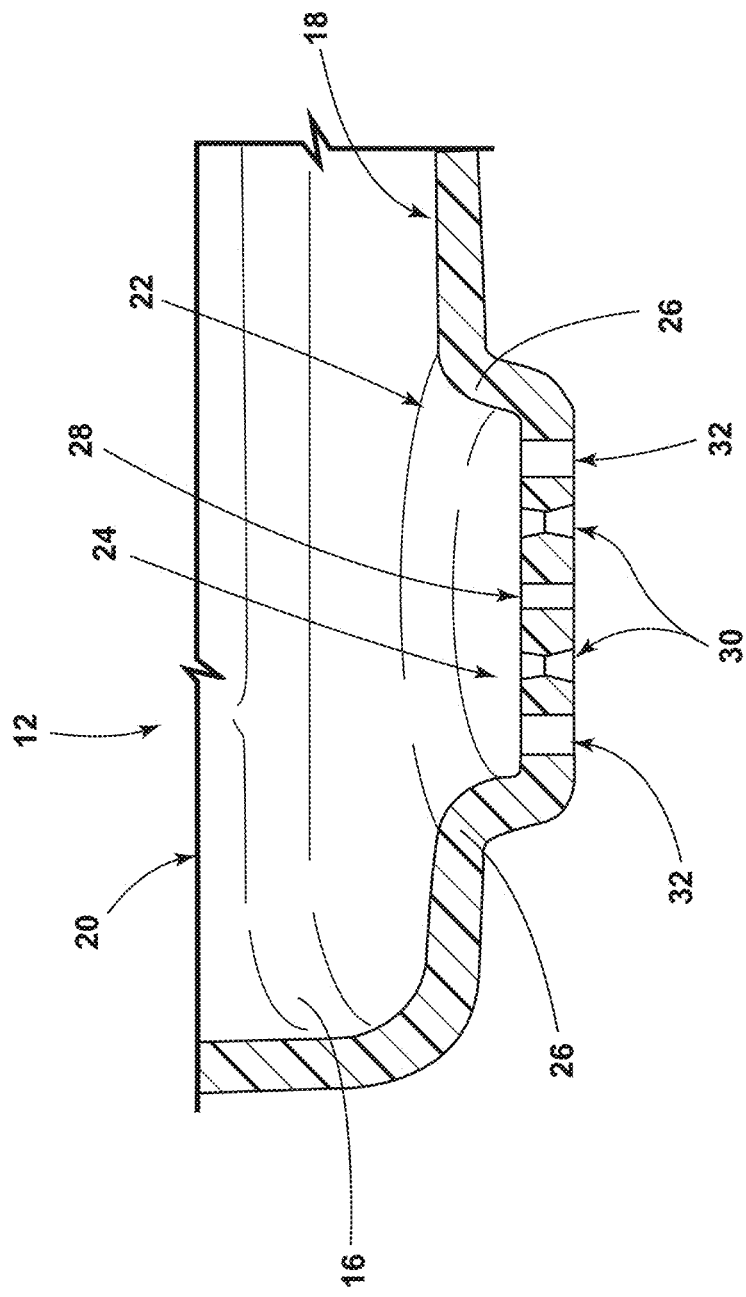
FIG. 3 is a cross-sectional view taken through line III-III of FIG. 2, illustrating the drain disposed within the storage compartment, according to one embodiment.

Referring now to FIGS. 1-3, the vehicle 10 may include a trunk configured for storing items. In some embodiments, the vehicle 10 may be an electric vehicle 10. As such, the vehicle 10 may not be equipped with a traditional internal combustion engine disposed under a hood generally near the front of the vehicle 10. In such embodiments, the vehicle 10 may include the front trunk 14, as shown in FIG. 1. The vehicle 10 may include the storage compartment 12. In various embodiments, the storage compartment 12 may be disposed within the vehicle 10. As shown in FIG. 1, in some embodiments the storage compartment 12 may be the front trunk 14 of the vehicle 10. It should be appreciated that the vehicle 10 may include one or more storage compartments 12 disposed at various positions of the vehicle 10 (e.g., a trunk, a vehicle interior, a console box, etc.). As shown in FIG. 1, in some embodiments a light-emitting device 74 may be disposed within and/or proximate to the storage compartment 12. In some embodiments, the light-emitting device 74 may be disposed within the front trunk 14 of the vehicle 10. As will be discussed in more detail below, the light-emitting device 74 may be configured to emit light onto the cap feature 34 of the drain assembly 22.

In further reference to FIGS. 1-3, the storage compartment 12 may include the base 18 and the storage compartment sidewall 16. The storage compartment sidewall 16 may extend generally vehicle-upward from the base 18 of the storage compartment 12 in various embodiments. As shown in FIG. 2, the base 18 and the storage compartment sidewall 16 may define a cavity 20 in the storage compartment 12.

Referring now to FIGS. 1-4, the vehicle 10 may include the drain assembly 22. In various embodiments, the drain assembly 22 may be disposed proximate to a vehicle substrate 70. In some embodiments, the drain assembly 22 may be disposed within the storage compartment 12. For example, in some embodiments, the drain assembly 22 may be disposed proximate to the base 18 of the storage compartment 12. The drain assembly 22 may include the drain 24. The drain 24 may be disposed within the vehicle substrate 70. In some embodiments, the drain 24 may be disposed within the base 18 of the storage compartment 12 of the vehicle 10. As shown in FIG. 3, the drain 24 may include a collar feature 26 and the floor 28. In some embodiments, the collar feature 26 may be coupled to and/or extend out of the vehicle substrate 70 that the drain 24 is disposed within and may generally surround the floor 28 of the drain 24. As shown in FIG. 3, in some embodiments the collar feature 26 may be coupled to and/or extend out of the base 18 of the storage compartment 12 and slope generally downward to the floor 28 of the drain 24.

Figure 4:
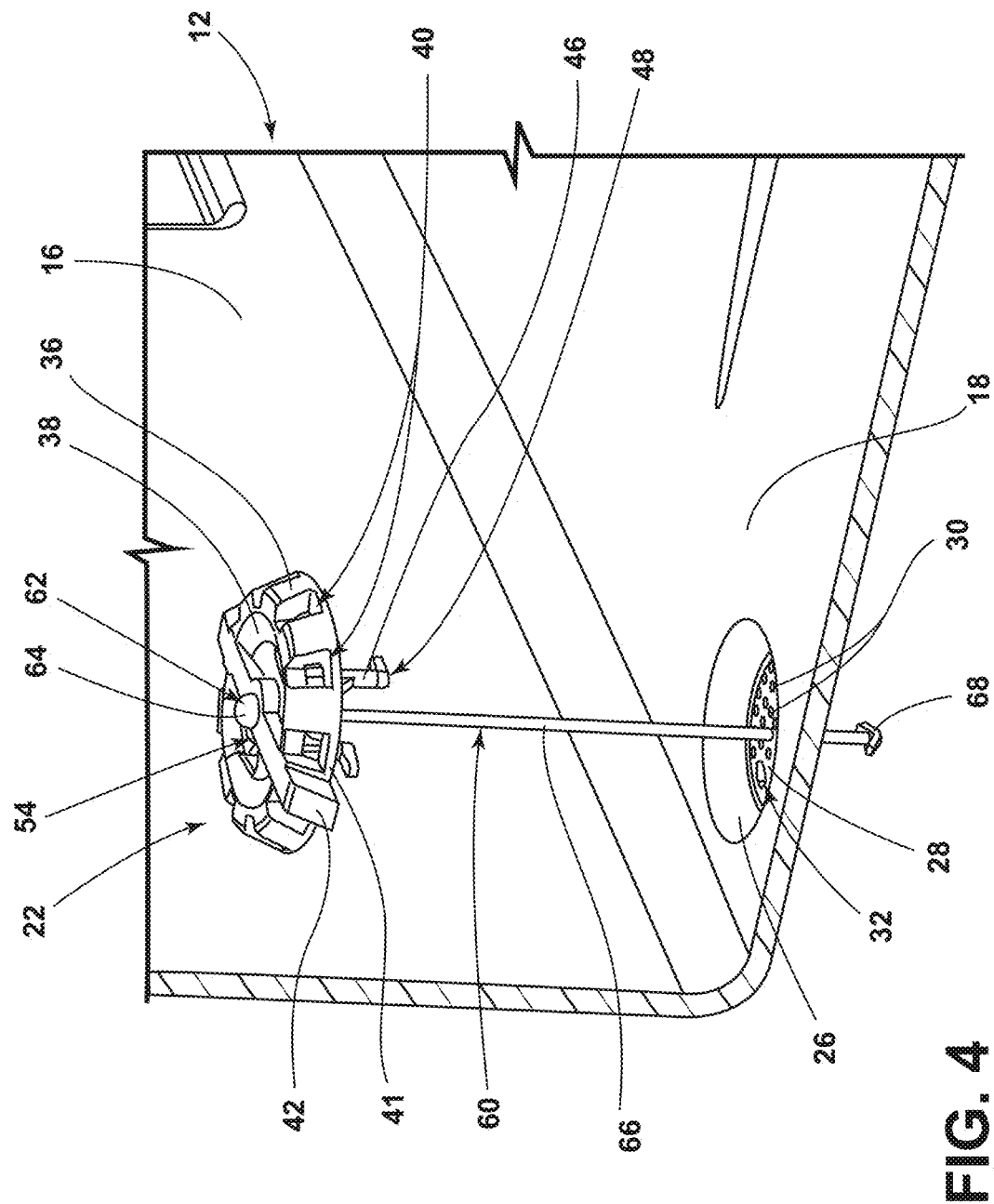
FIG. 4 is a perspective view of a drain assembly, illustrating a cap feature connected to the drain by an anchoring feature, according to one embodiment.

Referring now to FIGS. 3 and 4, the drain 24 may include the plurality of apertures 30. As shown in FIG. 3, the floor 28 of the drain 24 may define the plurality of apertures 30. The plurality of apertures 30 may extend through the floor 28 and may be configured to allow a liquid to flow through the drain 24.

Referring further to FIGS. 3 and 4, in various embodiments, the drain 24 may include the receiver 32. The receiver 32 may be configured to be engaged with the engagement feature 44 of the cap feature 34, as will be discussed in detail below. In some embodiments, the receiver 32 may be coupled to and/or extend outward from one or more components of the drain 24. For example, in some embodiments the receiver 32 may be coupled to and/or extend out of the floor 28 and/or the collar feature 26 of the drain 24. In various embodiments, the receiver 32 may be disposed proximate to the floor 28 of the drain 24. In some embodiments, as shown in FIGS. 3 and 4, the receiver 32 may be defined by the floor 28 of the drain 24. In some examples, the receiver 32 may be an elongated aperture defined by and extending through the floor 28 of the drain 24, as shown in FIG. 4. It is contemplated that the receiver 32 may be at least one of a variety of features configured to be engaged with the engagement feature 44 of the cap feature 34.

Figure 5:
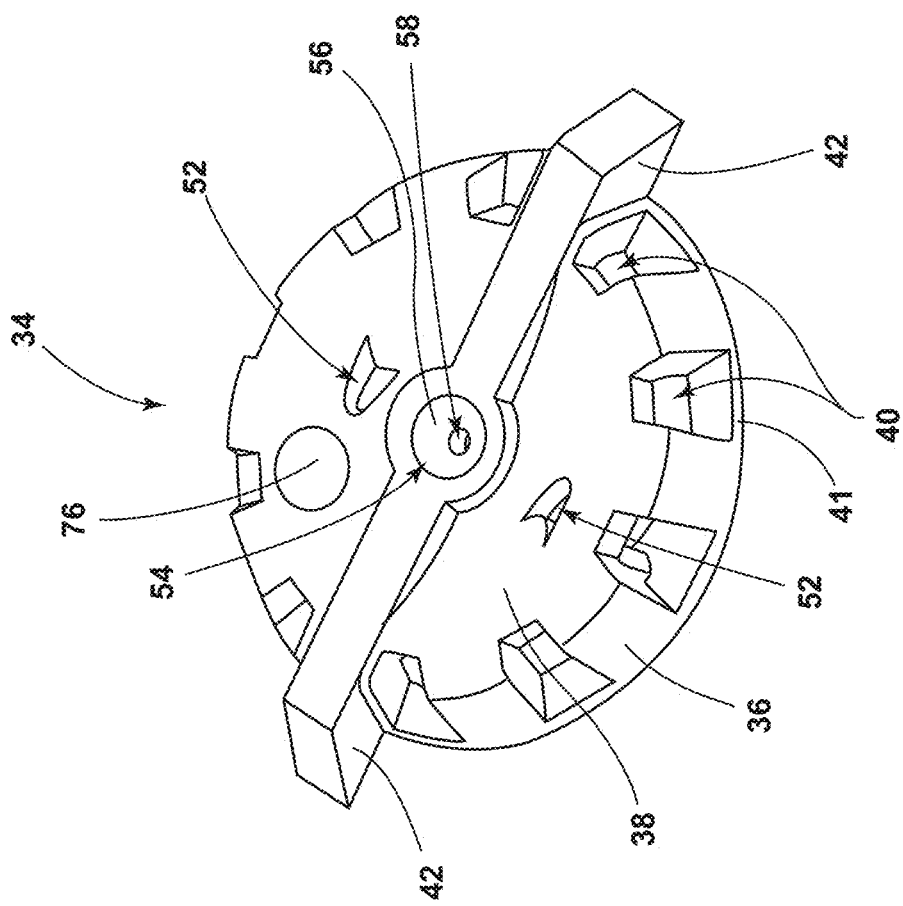
FIG. 5 is a top view of the cap feature, according to one embodiment.
Figure 6:
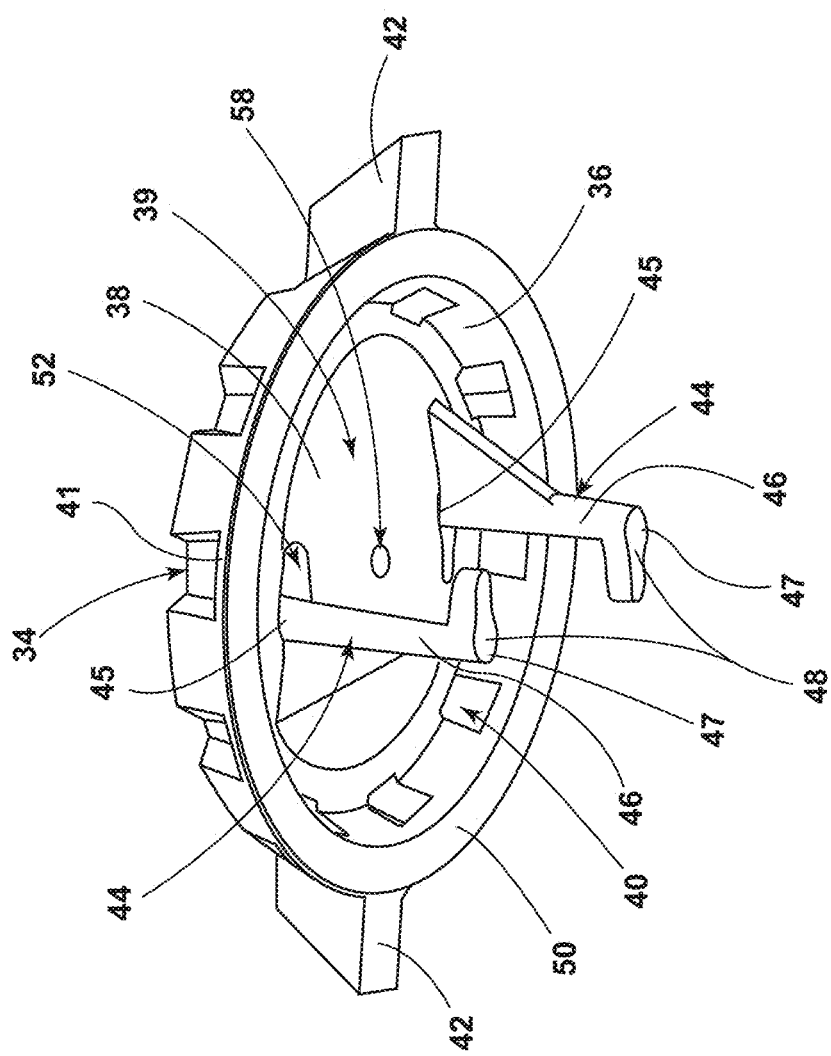
FIG. 6 is a lower elevational view of the cap feature, illustrating engagement features extending generally downward from the cap feature, according to one embodiment.
Figure 7:
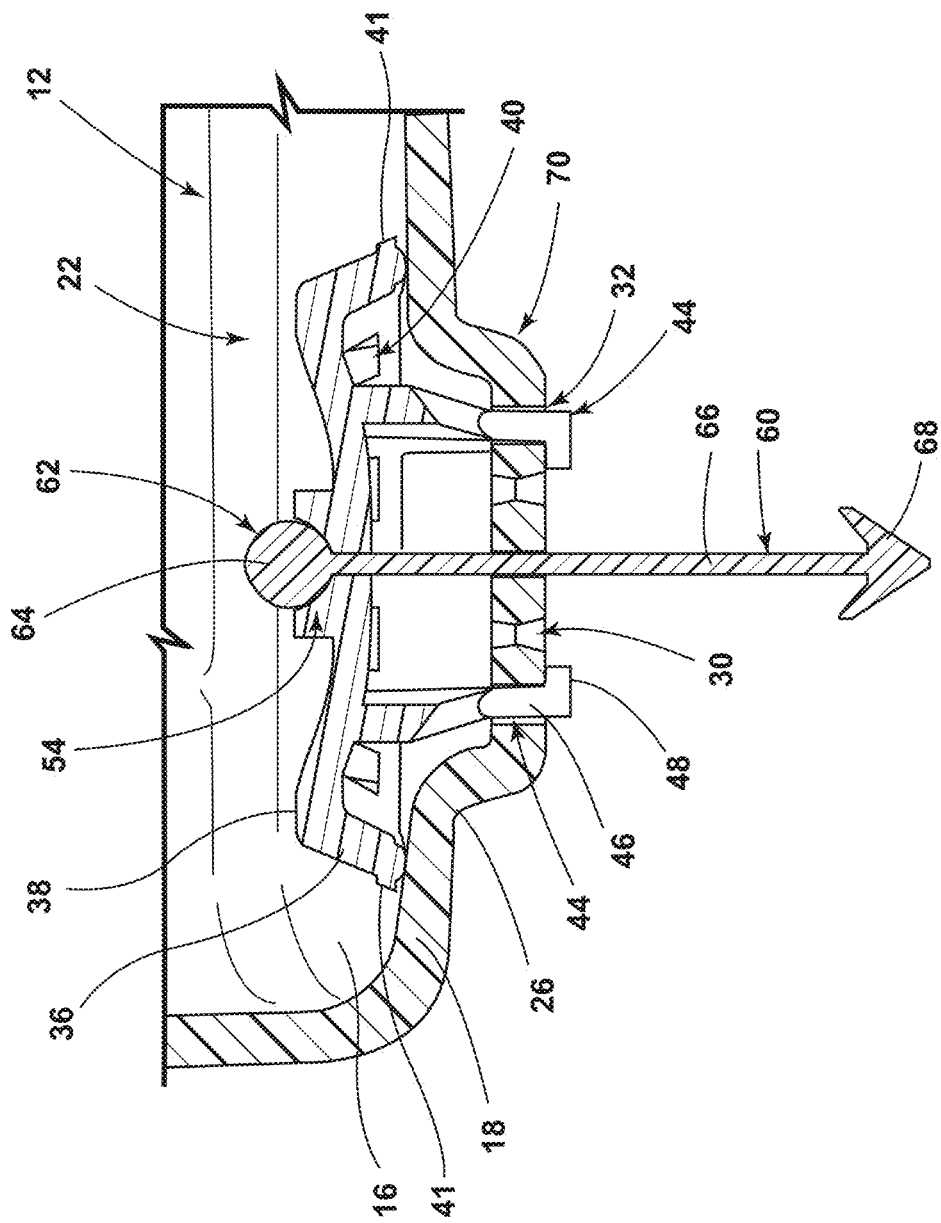
FIG. 7 is a cross-sectional view of the storage compartment similar to the cross-sectional view shown in FIG. 3, illustrating the cap feature in the assembled position relative to the drain, according to one embodiment.

Referring now to FIGS. 5-8B, in various embodiments, the drain assembly 22 may include the cap feature 34. The cap feature 34 may be configured to engage with the drain 24. As such, the cap feature 34 may be operably coupled to the drain 24. As depicted in FIGS. 5 and 6, in various embodiments, the cap feature 34 may include the upper platform 38. The sidewall 36 may extend generally downward from the upper platform 38. In some embodiments, as shown in FIG. 7, the sidewall 36 may extend generally outward from the upper platform 38 as the sidewall 36 extends generally downward from the upper platform 38. As shown in FIG. 6, the upper platform 38 and the sidewall 36 of the cap feature 34 may generally define a recess 39. The recess 39 may be cap feature-downward of the upper platform 38.

Referring now to FIGS. 4-7, in various embodiments, the cap feature 34 may include the cutout 40. The cutout 40 may be configured to allow liquid to flow through the cap feature 34. As shown in FIGS. 4-7, the cap feature 34 may include a plurality of cutouts 40. The cutout 40 may be defined by the cap feature 34. In other words, the cutout 40 may be the absence of material extending through the cap feature 34 to create an aperture for a liquid to flow through. As shown in FIG. 5, in some embodiments, the sidewall 36 and the upper platform 38 of the cap feature 34 may define the cutout 40, such that the cutout 40 extends through a portion of the sidewall 36 and a portion of the upper platform 38.

Referring now to FIGS. 4-6, in various embodiments, the cap feature 34 may include a lower rim 41. In some embodiments, the lower rim 41 may be a portion of and/or coupled to the sidewall 36 proximate to the end of the sidewall 36 that is distal to the upper platform 38. As shown in FIG. 5, the lower rim 41 may be generally cap feature-downward of the cutout 40. In other words, the cutout 40 may be disposed generally cap feature-upward of the lower rim 41. In some embodiments, the lower rim 41 may aid in keeping the cutout 40 of the cap feature 34, as well as the plurality of apertures 30 of the drain 24, unclogged, by catching debris before the debris enters the cutout 40, while allowing liquid to pass over the lower rim 41 and through the cutout 40.

Referring now to FIGS. 6 and 7, in some embodiments, the cap feature 34 may include a seal feature 50. The seal feature 50 may be configured to create a seal between the cap feature 34 and the vehicle substrate 70 that the drain assembly 22 is proximate to. The seal feature 50 may be coupled to the sidewall 36 of the cap feature 34. As shown in FIGS. 6 and 7, the seal feature 50 may be coupled to the cap feature 34 at a position proximate to the lower rim 41 of the cap feature 34. In some examples, the seal feature 50 may be generally cap feature-downward of the lower rim 41, and may be disposed between the sidewall 36 of the cap feature 34 and the drain 24 and/or the vehicle substrate 70 that the drain 24 is disposed within, as shown in FIG. 7. It is contemplated that, in various embodiments, the seal feature 50 may be at least one of a variety of features configured to create a seal between the cap feature 34 and at least one of the vehicle substrate 70, the base 18 of the storage compartment 12, the collar feature 26 of the drain assembly 22, the floor 28 of the drain 24, and/or a combination thereof (e.g., a band, a curtain, etc.). In various embodiments, the seal feature 50 may be configured to ensure a tension fit between the cap feature 34 and the drain 24 and/or the vehicle substrate 70 that the drain 24 is disposed within, such that liquid is forced to pool at the outer side of the sidewall 36 of the cap feature 34 and then flow through the cutout 40 defined by the cap feature 34.

Referring now to FIGS. 5 and 6, in various embodiments, the cap feature 34 may include a protruding feature 42 that extends outward from the sidewall 36 of the cap feature 34. As shown in FIGS. 5 and 6, in some embodiments, the cap feature 34 may include a plurality of protruding features 42. The protruding feature 42 may generally protrude outward from the cap feature 34. For example, in some embodiments, in which the lower rim 41 of the cap feature 34 is generally circular and generally defines a periphery of the cap feature 34, the protruding feature 42 may extend outward beyond the circular periphery defined by the lower rim 41. In some embodiments, the protruding feature 42 may be configured to aid a user in gripping and/or turning the cap feature 34 when the cap feature 34 is engaged with the drain 24 by providing a handhold for the user.

Referring now to FIGS. 4, 6, and 7, in various embodiments, the cap feature 34 may include the engagement feature 44. In various embodiments, the engagement feature 44 may be coupled to the cap feature 34 and may be configured to be engaged with the receiver 32 of the drain 24. In some embodiments, as shown in FIG. 6, the engagement feature 44 may include a leg 46 and a foot 48. The leg 46 may be coupled to the upper platform 38 at a first end 45 and may extend generally cap feature-downward to a second end 47. The foot 48 may be coupled to the leg 46 generally proximate to the second end 47 of the leg 46 and may extend generally outward therefrom, as shown in FIG. 6. It is contemplated that in some embodiments, the foot 48 may be disposed between the second end 47 of the leg 46 and the first end 45 of the leg 46. In some embodiments of the drain assembly 22, wherein the receiver 32 includes the elongated aperture extending through the floor 28 of the drain 24, the foot 48 of the engagement feature 44 may be sized to fit within the elongated aperture, such that the foot 48 may pass through the elongated aperture.

Figure 8A:
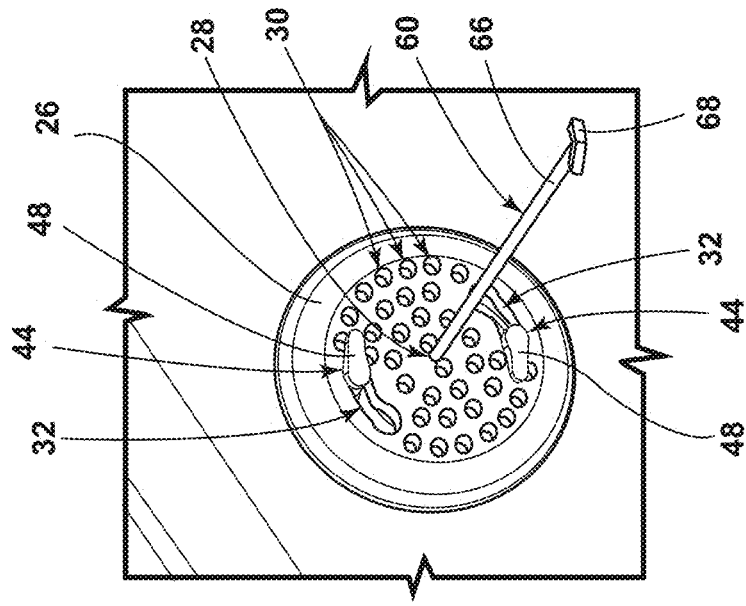
FIG. 8A is a lower elevational view of the drainage assembly, illustrating the cap feature in a disengaged position relative to the drain and the anchoring feature extending through an aperture in the drain, according to one embodiment.
Figure 8B:
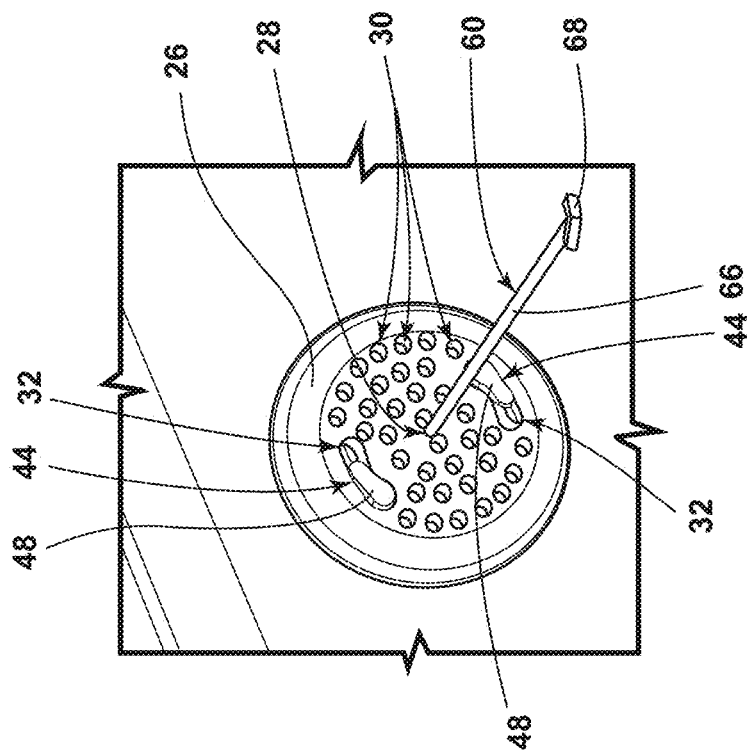
FIG. 8B is a lower elevational view of the drainage assembly, illustrating the cap feature in the engaged position relative to the drain and the anchoring feature extending through an aperture in the drain, according to one embodiment.

Referring now to FIGS. 8A and 8B, in various embodiments, the engagement feature 44 may be operable between a disengaged position and an engaged position. The engagement feature 44 may be configured to be engaged with the receiver 32 when the engagement feature 44 is in the engaged position. In some embodiments, the engagement feature 44 may be configured to protrude through the receiver 32, when the engagement feature 44 is in the engaged position. Further, in some embodiments, the engagement feature 44 may be configured to protrude through the receiver 32 when the engagement feature 44 is in the disengaged position. In some examples, as shown in FIGS. 8A and 8B, the engagement feature 44 may be configured to protrude through the receiver 32 when the engagement feature 44 is in the disengaged position and when the engagement feature 44 is in the engaged position. In further explanation of the example of the drain assembly 22 depicted in FIGS. 8A and 8B, in some embodiments, the foot 48 of the engagement feature 44 may fit through a portion of the receiver 32, which is shown as the elongated aperture in FIG. 8A. The foot 48 being configured to fit through the elongated aperture allows the engagement feature 44 to extend through the elongated aperture, which disposes the foot 48 generally below the underside of the floor 28 of the drain 24. This is depicted in FIG. 8A, wherein the engagement feature 44 is in the disengaged position. The engagement feature 44 may then be moved generally laterally within the receiver 32, such that the foot 48 overlaps with and engages the underside of the floor 28 of the drain 24, as shown in FIG. 8B, wherein the engagement feature 44 is in the engaged position. In some embodiments, the cap feature-upward surface of the foot 48 may be angled relative to the underside of the floor 28 of the drain 24, such that moving the engagement feature 44 to the engaged position causes the cap feature 34 to be drawn downward towards the drain 24. This action may make the seal feature 50 more effective at creating a seal. It is contemplated that the engagement feature 44 may include at least one of a variety of features configured to engage with the receiver 32 and may move between the disengaged position and the engaged position in at least one of a variety of ways.

Referring now to FIGS. 5 and 6, in various embodiments, a slot 52 may be defined by the cap feature 34. As shown in FIGS. 5 and 6, the slot 52 may be defined by the upper platform 38 of the cap feature 34. Further, in various embodiments, the slot 52 may be disposed proximate to the portion of the engagement feature 44 that is coupled to and/or extends out of the upper platform 38. In some examples, the slot 52 may be disposed proximate to the first end 45 of the leg 46 extending generally downward from the upper platform 38. Further, in some embodiments, a portion of the leg 46 may define a portion of the slot 52. The slot 52 may be helpful for efficient manufacturing of the cap feature 34, particularly when the cap feature 34 is made of plastic, as the slot 52 may enable manufacturing of the upper platform 38, sidewall 36, and engagement feature 44 without retooling.

Referring now to FIGS. 5-7, in some embodiments, the cap feature 34 may include an attachment feature 54. The attachment feature 54 may be configured to be operably coupled with an anchoring feature 60, as will be discussed in more detail below. As depicted in FIG. 5, in some embodiments, the attachment feature 54 may include a socket 56 and a hole 58, defined by the cap feature 34. As shown in FIG. 5, the socket 56 may generally be defined by the upper platform 38 and/or a component extending out of and/or coupled to the upper platform 38. The hole 58 may generally be defined by the upper platform 38 and may originate within the socket 56 and extend generally cap feature-downward through the upper platform 38. It should be appreciated that the attachment feature 54 may be at least one of a variety of features configured to attach to the anchoring feature 60, in various embodiments.

Referring now to FIGS. 4 and 7-8B, in various embodiments, the drain assembly 22 may include the anchoring feature 60. The anchoring feature 60 may be configured to be operably coupled to the drain 24 and to the cap feature 34, as shown in FIG. 4. In various embodiments, the anchoring feature 60 may be attached to the cap feature 34 via the attachment feature 54. As shown in FIG. 7, the anchoring feature 60 may include a connector 62, a tether 66 coupled to the connector 62, and an anchor 68 coupled to the tether 66. The connector 62 may be configured to be attached to the attachment feature 54 of the cap feature 34. As depicted in FIG. 7, in some embodiments in which the attachment feature 54 includes the socket 56 and the hole 58, the connector 62 of the anchoring feature 60 may include a ball 64 configured to be seated within the socket 56. The tether 66 may be coupled to the ball 64 and may extend through the hole 58, defined by the upper platform 38 of the cap feature 34. The tether 66 may extend generally downward from the ball 64 through the hole 58 and may protrude through at least one of the plurality of apertures 30 defined by the floor 28 of the drain 24. As further shown in FIG. 7, the anchor 68 may be coupled generally proximate to the end of the tether 66 that is distal from the end of the tether 66 coupled to the connector 62. The anchor 68 may be coupled to a portion of the tether 66 that is disposed generally downward of the drain 24 and may be configured to catch on the underside of the floor 28 of the drain 24 to prevent the anchoring feature 60 from becoming entirely disconnected from the drain 24 when the cap feature 34 is moved away from the drain 24, as shown in FIG. 4. Similarly, the connector 62 may be configured to ensure that the anchoring feature 60 does not become detached from the cap feature 34 and fall down the drain 24. It is contemplated that the anchoring feature 60 may be at least one of a variety of features configured to attach to the attachment feature 54 and operably couple the drain 24 to the cap feature 34.

Referring now to FIGS. 4 and 7-8B, in various embodiments, the cap feature 34 may be operable between various positions. In some embodiments, the cap feature 34 may be operable between an assembled position, wherein the cap feature 34 is assembled to the drain 24 as shown in FIG. 7, and a removed position, wherein the cap feature 34 is not assembled to the drain 24, as shown in FIG. 4. In various embodiments, the tether 66 of the anchoring feature 60 may slide within at least one of the plurality of apertures 30 defined by the floor 28 of the drain 24 as the cap feature 34 moves between the assembled position and the removed position. In some embodiments, the engagement feature 44 may extend through the receiver 32 defined by the floor 28 of the drain 24 when the cap feature 34 is in the assembled position, as shown in FIG. 7.

Referring now to FIGS. 8A and 8B, in some embodiments, the cap feature 34 may be operable between a first position and a second position relative to the drain 24. In some embodiments, the cap feature 34 may move between the first position and second position while the cap feature 34 is in the assembled position. Further, in some embodiments, the cap feature 34 may move from the first position to the second position via rotational movement of the cap feature 34. For example, as shown in FIGS. 8A and 8B, the foot 48 of the engagement feature 44 may protrude through the receiver 32 defined by the floor 28 of the drain 24 when the cap feature 34 is in the assembled position and the first position, as shown in FIG. 8A; the cap feature 34 may then be rotated relative to the drain 24, such that the foot 48 of the engagement feature 44 slides within the receiver 32 to overlap and engage with the underside of the floor 28 of the drain 24, as the cap feature 34 moves from the first position to the second position while remaining in the assembled position. As such, in some embodiments, movement of the cap feature 34 from the first position to the second position may move the engagement feature 44 from the disengaged position to the engaged position. In some embodiments, the foot 48 of the engagement feature 44 may be generally aligned with the receiver 32 when the cap feature 34 is in the first position and not generally aligned with the receiver 32 when the cap feature 34 is in the second position.

Figure 9:
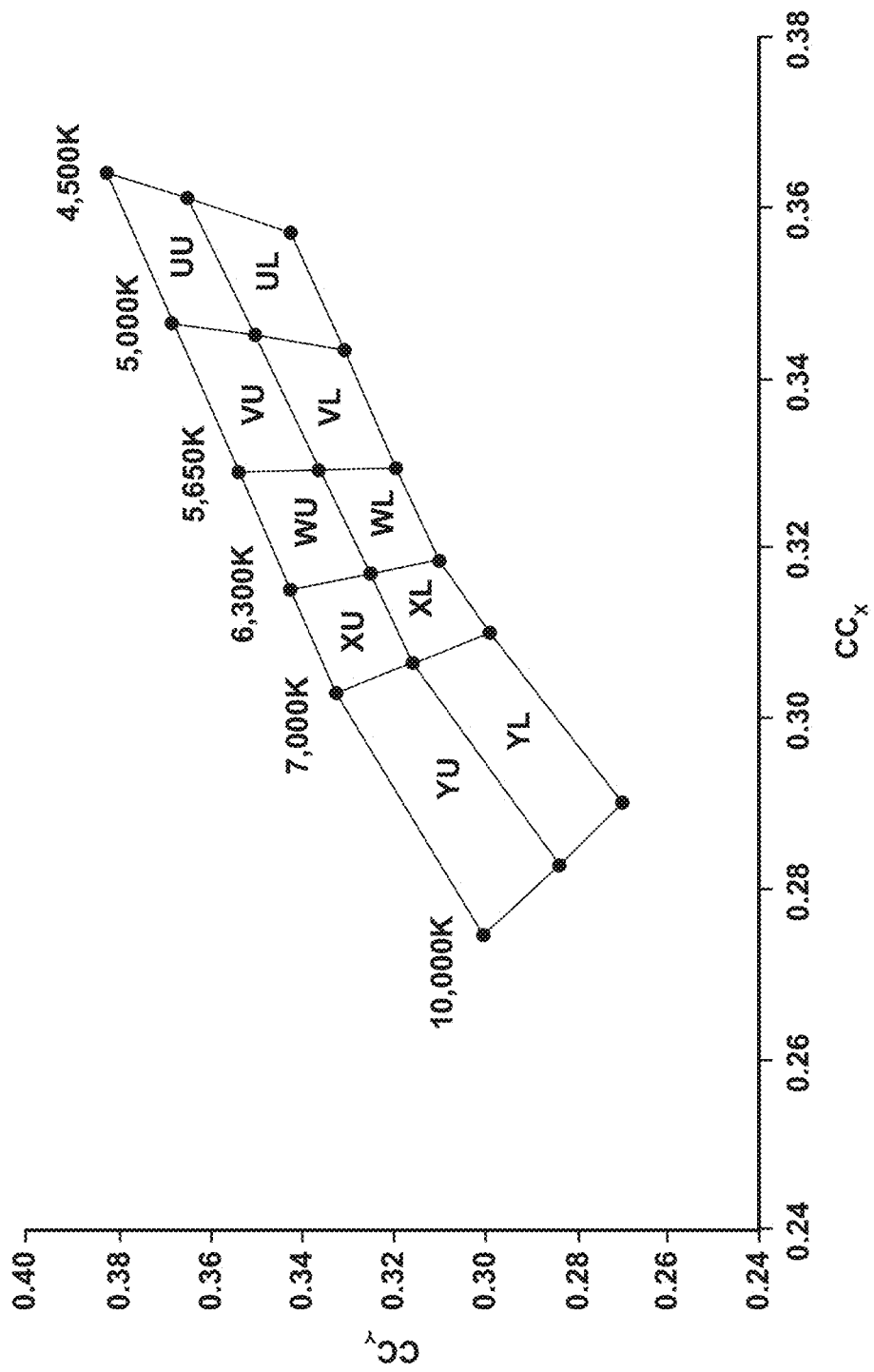
FIG. 9 is a chart that represents various color temperatures shown as bins within the chart, according to one embodiment.
Figure 10:
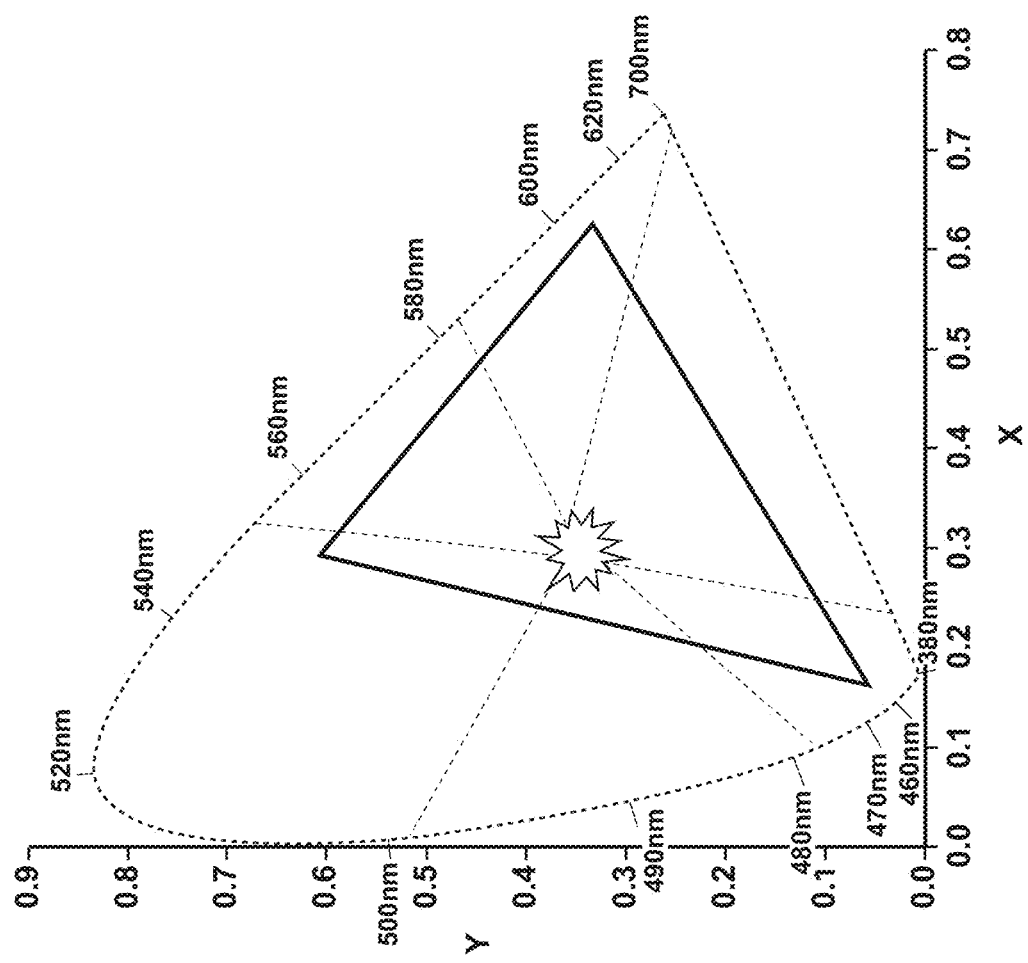
FIG. 10 is a color temperature graph, illustrating particular color temperatures within a triangle, according to one embodiment.

In reference to FIGS. 9 and 10, in various embodiments, the cap feature 34 may be made of at least one of a variety of materials that may include, but is not limited to, plastic, rubber, metal, natural materials, textiles, synthetic materials, and/or a combination thereof. In some embodiments, the cap feature 34 may include phosphor. In other words, phosphor may be coupled to the cap feature 34. In some implementations, the phosphor may be contained within a material of the cap feature 34, such that the cap feature 34 is configured to emit visible light via energization of the phosphor, as described further herein. In some implementations, the cap feature 34 may include phosphor via a sticker 76 that contains phosphor, applied to the cap feature 34, as illustrated in FIG. 5. The cap feature 34 may include a particular variety of phosphor that is configured to be energized quickly by white light having a color temperature between 7,000° and 10,000° Kelvin. For example, the phosphor may be energized as quickly as within a half-hour when positioned proximate to the light-emitting device 74, when the light-emitting device 74 is configured as a quarter watt LED.

Once the phosphor is energized, it may glow intensely for about one hour and may continue to emit a perceptible glow for upwards of 24 hours, in some embodiments. The light-emitting device 74 may be configured to emit light having particular color temperatures that may best interact with the phosphor disposed in the cap feature 34. For example, in reference to FIG. 9, the light-emitting device 74 may emit light that has a color temperature similar to the color temperature represented in the YU and YL bins illustrated in FIG. 9. White light having these color temperatures may be more effective in energizing the phosphor contained within the cap feature 34. It is contemplated that the phosphor contained within the cap feature 34 may be energized by light having color temperatures other than the color temperatures represented in the YU and YL bins of FIG. 9.

In reference to FIG. 10, the triangle disposed within the illustrated color curve is generally representative of where the particular phosphor colors would map on the standard CIE chromaticity. In particular, the triangle within FIG. 10 demonstrates various tints, hues, and color combinations, including white, that may be achieved by combining the particular phosphors. In some embodiments, the cap feature 34 may be formed with phosphor therein by molding the cap feature 34 from a polymer that contains a mixture of long-persistence, high intensity, high quality phosphor in proportion of about 5% phosphor by weight added to the polymer. The polymer may be translucent and/or clear, in some embodiments, such that light may transmit through the plastic to energize the phosphor. In some embodiments, the cap feature 34 may be formed of an impact modified UV stable polycarbonate. Such a polymer may provide UV stability as well as desirable impact properties. In such embodiments, the mixture of the polymer and high quality phosphor may contain about 10% to about 15% of the high quality phosphor by weight. In some embodiments, the polymer used for the cap feature 34 may include amorphous nylon or polyphthalamide (PPA). The addition of phosphor to the material used to form the cap feature 34 may allow the phosphor and, therefore, the cap feature 34 to glow in the dark when the phosphor is energized. It is contemplated that, in some embodiments, a variety of mechanisms and/or materials may be utilized to make the cap feature 34 glow in the dark.

The present disclosure may provide a variety of advantages. First, the lower rim 41 of the cap feature 34 being disposed generally downward of the cutout 40 defined by the sidewall 36 and the upper platform 38 may aid in preventing the cutout 40 from being clogged, while still allowing a liquid to flow through the cutout 40. Second, the anchoring feature 60 may help prevent the cap feature 34 from being misplaced or lost. Third, the glow-in-the-dark nature of certain embodiments of the cap feature 34 may provide contrast between the cap feature 34 and its surroundings, which may aid a user in locating and maneuvering the cap feature 34 and/or removing clogs from the drain 24.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A drainage system for a vehicle, comprising:
   a drain disposed within a vehicle substrate and having a floor;
   a plurality of apertures defined by the floor and configured to allow liquid to flow through the drain;

a cap feature operably coupled to the drain and having an upper platform and a sidewall that extends generally downward from the upper platform to define a recess; and a cutout defined by the cap feature and configured to allow liquid to flow through the cap feature, wherein the sidewall and the upper platform define the cutout such that the cutout extends through a portion of the sidewall and a portion of the upper platform.

2. The drainage system of claim 1, further comprising:

a receiver disposed proximate to the floor of the drain; and an engagement feature coupled to the cap feature and operable between a disengaged position and an engaged position in which the engagement feature is engaged with the receiver, wherein the cap feature is operable to move between first and second positions relative to the drain and movement of the cap feature from the first position to the second position moves the engagement feature from the disengaged position to the engaged position.

3. The drainage system of claim 2, wherein the receiver is an elongated aperture extending through the floor of the drain.

4. The drainage system of claim 3, wherein the engagement feature extends downward from the upper platform of the cap feature into the recess and is configured to protrude through the receiver in the engaged position.

5. The drainage system of claim 4, wherein the engagement feature is configured to protrude through the receiver in the disengaged position.

6. The drainage system of claim 5, wherein the cap feature moves from the first position to the second position via rotational movement of the cap feature.

7. The drainage system of claim 5, wherein the engagement feature comprises:

a leg coupled to the upper platform at a first end and extending downward to a second end; and a foot coupled to the leg proximate to the second end of the leg and extending outward therefrom.

8. The drainage system of claim 7, wherein the foot of the engagement feature is aligned with the receiver in the first position of the cap feature and is not aligned with the receiver in the second position of the cap feature.

9. The drainage system of claim 1, wherein the sidewall of the cap feature comprises:

a lower rim disposed cap feature-downward of the cutout.

10. The drainage system of claim 1, wherein the cap feature contains phosphor configured to be energized by light.

11. A vehicle, comprising:

a storage compartment having a base and a storage compartment sidewall that extends generally vehicle-upward from the base, wherein the storage compartment is a front trunk of the vehicle; and a drain assembly disposed proximate to the base and comprising:

a drain disposed within the base and having a floor;

a plurality of apertures defined by the floor and configured to allow liquid to flow through the drain;

a cap feature operable between an assembled position, wherein the cap feature is assembled to the drain, and a removed position, the cap feature having an upper platform and a sidewall that extends generally downward from the upper platform;

a cutout defined by the cap feature and configured to allow liquid to flow through the cap feature; and an anchoring feature coupled to the cap feature and the drain in the assembled position of the cap feature and the removed position of the cap feature.

12. The vehicle of claim 11, wherein the anchoring feature comprises:

a tether that extends through a hole defined by the upper platform of the cap feature and through at least one of the plurality of apertures defined by the floor of the drain.

13. The vehicle of claim 12, wherein the tether slides within at least one of the plurality of apertures as the cap feature moves between the assembled position and the removed position.

14. The vehicle of claim 13, wherein the anchoring feature further comprises:

a ball coupled to the tether and configured to be seated within a socket defined by the upper platform of the cap feature.

15. The vehicle of claim 11, wherein the sidewall and the upper platform of the cap feature define the cutout such that the cutout extends through a portion of the sidewall and a portion of the upper platform.

16. A vehicle, comprising:

a storage compartment disposed within the vehicle;

a light-emitting device coupled to the vehicle and configured to emit light into the storage compartment;

a drain disposed within a base of the storage compartment;

a cap feature operably coupled to the drain and having a cutout configured to allow liquid to flow through the cap feature and into the drain; and a phosphor coupled to the cap feature, wherein the phosphor is configured to be energized by the light emitted by the light-emitting device and emit visible light.

17. The vehicle of claim 16, wherein the phosphor is contained within a material of the cap feature, such that the cap feature is configured to emit visible light via the phosphor.

18. The vehicle of claim 16, wherein the cap feature comprises:

an upper platform and a sidewall extending generally downward from the upper platform to define a recess.

19. The vehicle of claim 18, wherein the cutout is defined by the upper platform and the sidewall and extends through a portion of the sidewall and a portion of the upper platform.

20. The vehicle of claim 19, wherein the cap feature comprises:

a lower rim disposed cap feature-downward of the cutout.

* * * * *